(12) United States Patent
Mo

(10) Patent No.: US 12,522,117 B2
(45) Date of Patent: Jan. 13, 2026

(54) CHILD SAFETY SEAT

(71) Applicant: BAMBINO PREZIOSO SWITZERLAND AG, Steinhausen (CH)

(72) Inventor: Xiaolong Mo, Steinhausen (CH)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 210 days.

(21) Appl. No.: 18/255,700

(22) PCT Filed: Dec. 3, 2021

(86) PCT No.: PCT/EP2021/084218
§ 371 (c)(1),
(2) Date: Jun. 2, 2023

(87) PCT Pub. No.: WO2022/117843
PCT Pub. Date: Jun. 9, 2022

(65) Prior Publication Data
US 2024/0367560 A1 Nov. 7, 2024

(30) Foreign Application Priority Data
Dec. 4, 2020 (CN) .......................... 202011412522.4

(51) Int. Cl.
*B60N 2/28* (2006.01)
(52) U.S. Cl.
CPC ......... *B60N 2/2869* (2013.01); *B60N 2/2821* (2013.01)
(58) Field of Classification Search
CPC .... B60N 2/2869; B60N 2/2824; B60N 2/286; B60N 2/2863; B60N 2/2821
See application file for complete search history.

(56) References Cited

U.S. PATENT DOCUMENTS

| 7,731,284 B2 | 6/2010 | Lhomme et al. |
| 2019/0135142 A1* | 5/2019 | Jung .................... B60N 2/2821 |

(Continued)

FOREIGN PATENT DOCUMENTS

| CN | 204547847 U | 8/2015 |
| CN | 105722720 A | 6/2016 |

(Continued)

OTHER PUBLICATIONS

International Search Report issued in corresponding International Application No. PCT/EP2021/084218, dated Mar. 24, 2022, pp. 1-2, European Patent Office, Rijswijk, Netherlands.

(Continued)

*Primary Examiner* — David R Dunn
*Assistant Examiner* — Tania Abraham
(74) *Attorney, Agent, or Firm* — HAUPTMAN HAM, LLP

(57) ABSTRACT

A child safety seat including a base; a rotatable seat above the base and having a forward-facing mode and a rearward-facing mode; and a misuse prevention mechanism on the base and the seat and having a locked state and a released state, wherein when the misuse prevention mechanism is in the locked state and the seat is between the rearward-facing mode and a rotation threshold angle, a rotation angle of the seat in the first direction cannot be greater than the rotation threshold angle; and wherein when the misuse prevention mechanism is in the released state and the seat is between the rearward-facing mode and the rotation threshold angle, the rotation angle of the seat can be greater than the rotation threshold angle; the first direction is a rotation direction from the rearward-facing mode to the forward-facing mode.

20 Claims, 14 Drawing Sheets

(56) References Cited

U.S. PATENT DOCUMENTS

| | | | |
|---|---|---|---|
| 2020/0346566 A1* | 11/2020 | Frank | B60N 2/2821 |
| 2021/0237626 A1 | 8/2021 | Longenecker et al. | |
| 2022/0032823 A1 | 2/2022 | Mochizuki et al. | |
| 2022/0402412 A1* | 12/2022 | Cui | B60N 2/268 |

FOREIGN PATENT DOCUMENTS

| | | |
|---|---|---|
| CN | 106985714 | 7/2017 |
| CN | 207809123 U | 9/2018 |
| CN | 108621880 A | 10/2018 |
| CN | 208291038 | 12/2018 |
| CN | 208813033 U | 5/2019 |
| CN | 211166560 | 8/2020 |
| CN | 216610964 U | 5/2022 |
| CN | 114590181 A | 6/2022 |
| EP | 3950420 A1 | 2/2022 |
| TW | 548214 | 8/2003 |
| TW | 201601951 A | 1/2016 |
| TW | 201623045 A | 7/2016 |
| TW | I645991 | 1/2019 |
| TW | 202216500 A | 5/2022 |
| TW | 202224988 A | 7/2022 |
| WO | 2012146761 | 11/2012 |
| WO | 2021094553 A1 | 5/2021 |
| WO | 2022117843 A1 | 6/2022 |

OTHER PUBLICATIONS

Taiwan First Office Action issued in corresponding Taiwan Application No. TW110145147, pp. 1-6.

Taiwan First Office Action issued in corresponding Taiwan Application No. 112132075, dated Apr. 16, 2024, pp. 1-9.

International Search Report and Written Opinion issued in corresponding International Application No. PCT/EP2023/073335, dated Apr. 9, 2024, pp. 1-2, European Patent Office, Rijswijk, Netherlands.

* cited by examiner

CHILD SAFETY SEAT

CROSS REFERENCE TO RELATED APPLICATIONS

This application is a U.S. National Stage of International Application No PCT/EP2021/084218, filed on Dec. 3, 2021, which claims priority to Chinese Patent Application No. 202011412522.4, entitled "CHILD SAFETY SEAT", filed on Dec. 4, 2020, the entire content of which is incorporated herein by reference.

TECHNICAL FIELD

The present disclosure relates to a child safety seat.

BACKGROUND

A child safety seat is a seat specially designed for children. By assembling the child safety seat in a car, a child may ride in the car on the child safety seat. The child safety seat is used to restrain the child to protect the child's safety.

An ISOFIX interface is an international standard (ISO 13216) for attachment points for child safety seats in cars. The existing child safety seat usually includes a base and a seat arranged on the base, and the ISOFIX interface is directly arranged on a side of the base. The top pole or support pole can be further provided on the base to provide a firmer fixation. In order to accommodate children of different ages, the seat may be rotated relative to the base to have a forward-facing mode and a rearward-facing mode. Generally, the forward-facing mode is suitable for older children to ride, and the rearward-facing mode is suitable for younger children to ride.

It is more dangerous for younger children to use the forward-facing mode. However, the existing child safety seat does not provide a convenient misuse prevention mechanism to prevent the seat from being inadvertently rotated from the rearward-facing mode to the forward-facing mode.

SUMMARY

An object of one or more embodiments of the present disclosure is to provide a child safety seat, which can conveniently and reliably prevent the occurrence of the inadvertent rotation.

In order to achieve the above object, in one aspect, the present disclosure provides a child safety seat comprising: a base; a rotatable seat above the base and having a forward-facing mode and a rearward-facing mode relative to the base; and a misuse prevention mechanism formed on the base and the seat and having a locked state and a released state, wherein when the misuse prevention mechanism is in the locked state and in the case that the seat is between the rearward-facing mode and a rotation threshold angle, a rotation angle of the seat in a first direction cannot be greater than the rotation threshold angle; and wherein when the misuse prevention mechanism is in the released state and in the case that the seat is between the rearward-facing mode and the rotation threshold angle, the rotation angle of the seat can be greater than the rotation threshold angle; the first direction is a rotation direction from the rearward-facing mode to the forward-facing mode.

At least one embodiment of the present disclosure has at least one of the following beneficial effects.

The child safety seat of at least one embodiment of the present disclosure can prevent the seat from being rotated by mistake. Specifically, the child safety seat of the present invention requires an additional operation to allow the seat to rotate from the rearward mode to the forward-facing mode, without preventing the seat from normally rotating from the forward-facing mode to the rearward-facing mode. This additional operation can be made on either side. Moreover, the child safety seat of at least one embodiment of the present disclosure can clearly indicate whether the seat is in the locked state or the released state.

BRIEF DESCRIPTION OF THE DRAWINGS

By considering the following detailed description of the embodiments of the present disclosure in conjunction with the accompanying drawings, various objectives, features, and advantages of the present disclosure will become more apparent. The drawings are merely exemplary illustrations of the present disclosure and are not necessarily drawn to scale. In the drawings, the same reference numerals always refer to the same or similar parts. In the drawings.

DETAILED DESCRIPTION

In order to further illustrate the principle and structure of the present disclosure, the embodiments of the present disclosure will be described in detail with reference to the accompanying drawings. However, the embodiments are only provided for illustration and explanation, and cannot be used to limit the scope of patent protection of the present disclosure.

The terms used in the present disclosure are only for the purpose of describing specific embodiments, and are not intended to limit the present disclosure. The singular forms of "a", "said" and "the" used in the present disclosure and the appended claims are also intended to include plural forms, unless the context clearly indicates other meanings. It should also be understood that the term "and/or" as used herein refers to and includes any or all possible combinations of one or more associated listed items.

The following is a more detailed description of a child safety seat and the various concepts and implementations of the child safety seat. The seat of the child safety seat can be rotated among the rearward-facing mode, a side-facing mode and the forward-facing mode to facilitate use. It should be understood that the various concepts introduced above and discussed in more detail below can be implemented in a variety of ways. Examples of specific implementations and applications are mainly for illustrative purposes, so that those skilled in the art can implement implementations and alternatives that are obvious to those skilled in the art.

The child safety seat is placed on a seat of a vehicle and is fixed by anchors or the like to provide safety protection for the child.

Figure 1:
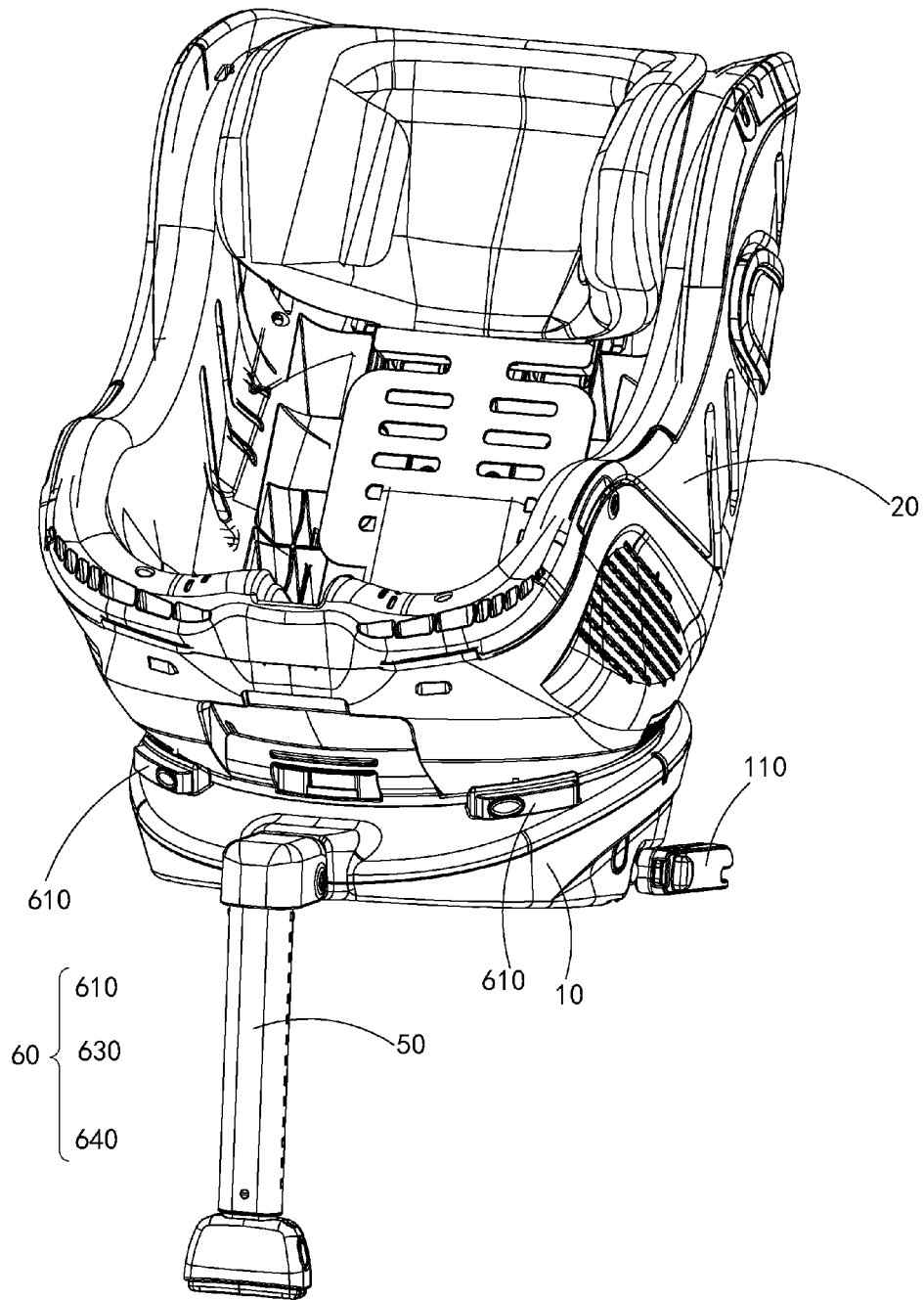
FIG. 1 is a perspective view of an embodiment of the child safety seat of the present disclosure.
Figure 2:
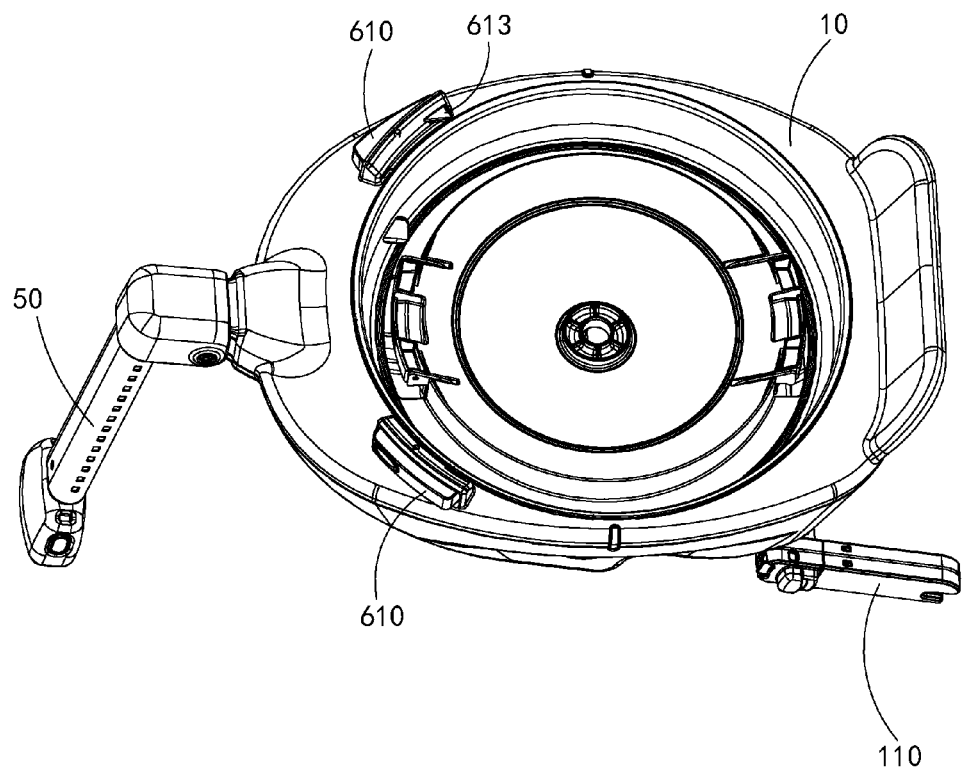
FIG. 2 is a top view of the FIG. 1 embodiment of the child safety seat of the present disclosure, in which the seat is removed in order to show an internal structure.
Figure 3:
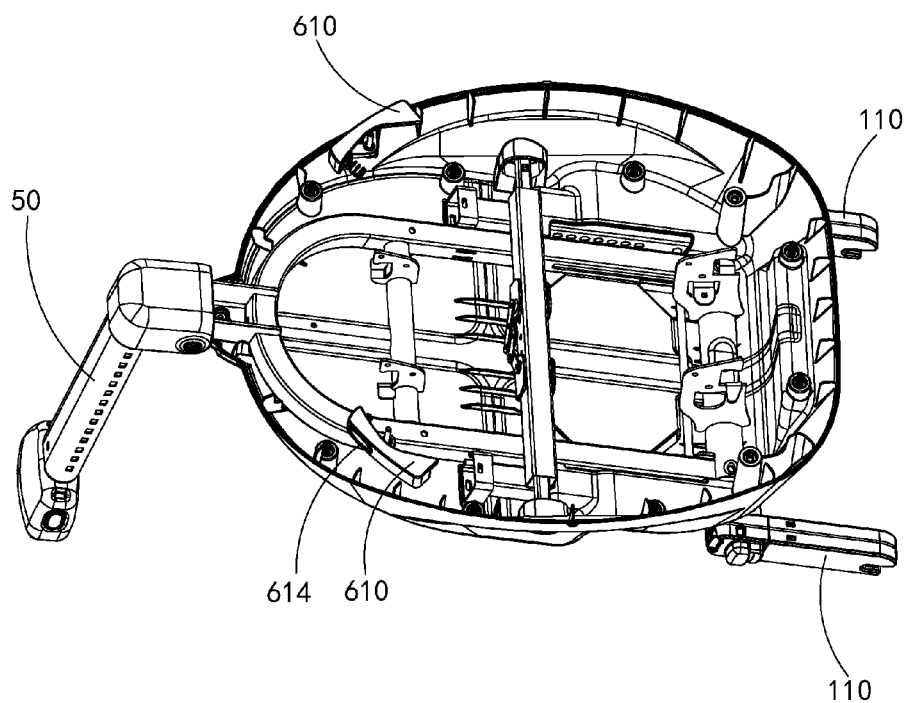
FIG. 3 is a top view of the FIG. 1 embodiment of the child safety seat of the present disclosure, in which the seat and an upper part of the base are removed in order to show the internal structure.
Figure 4:
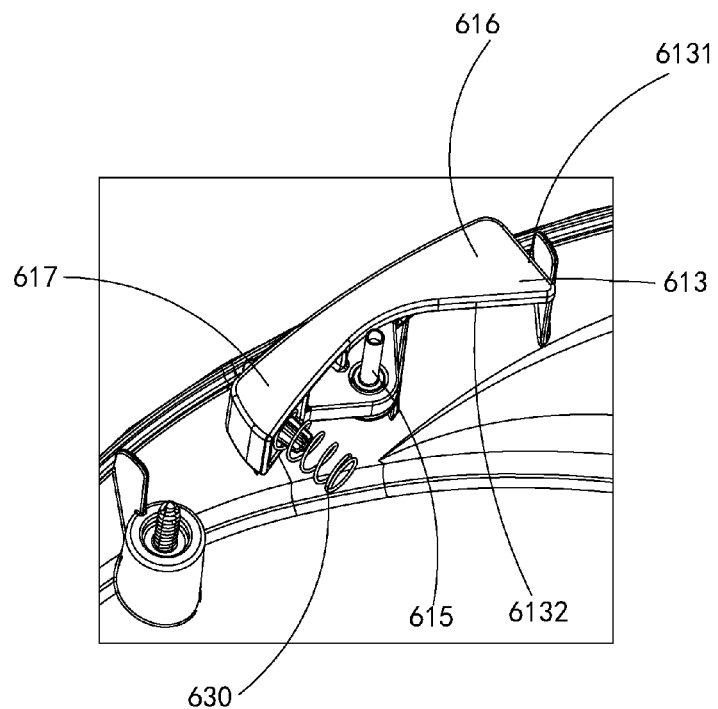
FIG. 4 is a partial enlarged view of the FIG. 3 embodiment.
Figure 5:
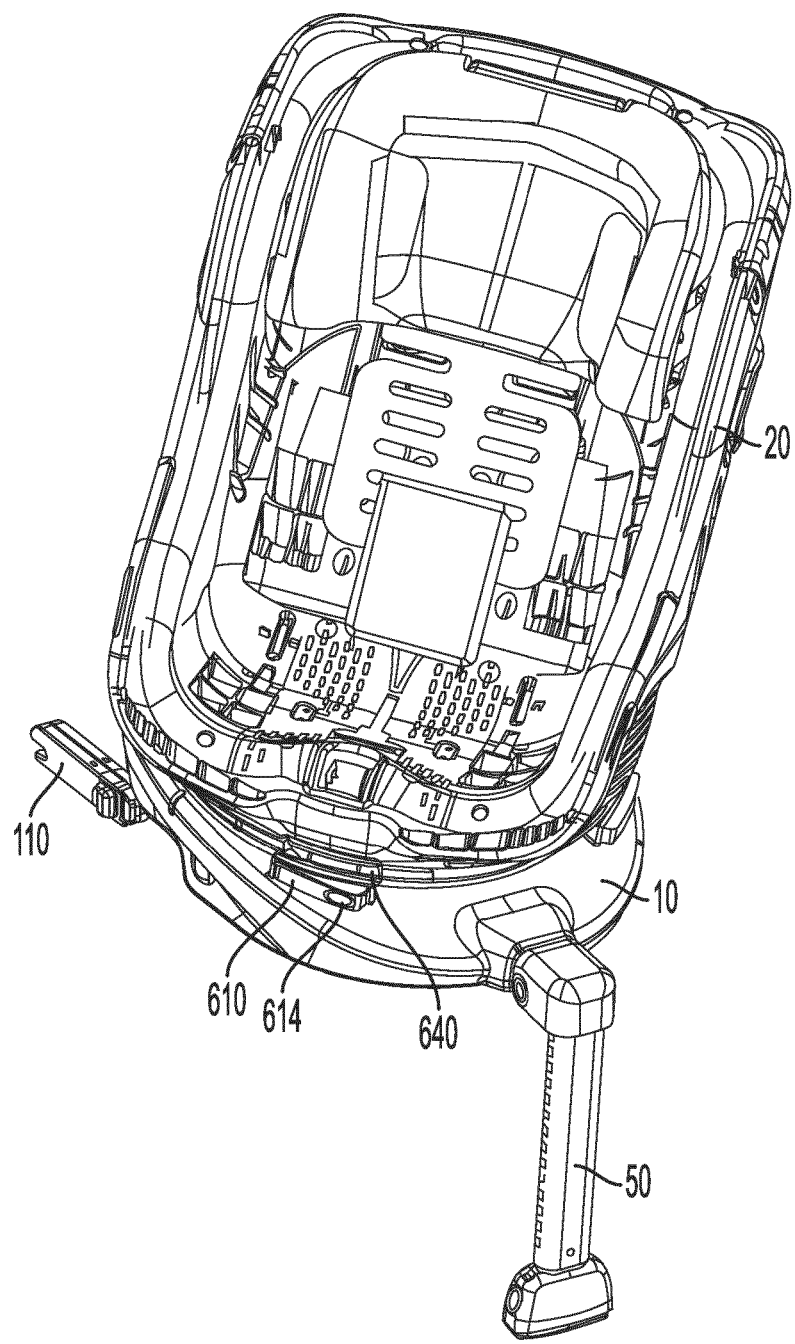
FIG. 5 is a perspective view of the FIG. 1 embodiment of the child safety seat of the present disclosure, in which the seat is rotated by an angle relative to the state in FIG. 1.
Figure 6:
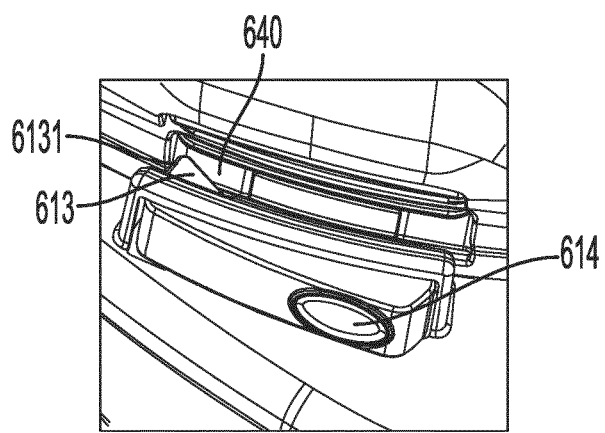
FIG. 6 is a partial enlarged view of the FIG. 5 embodiment.
Figure 7:
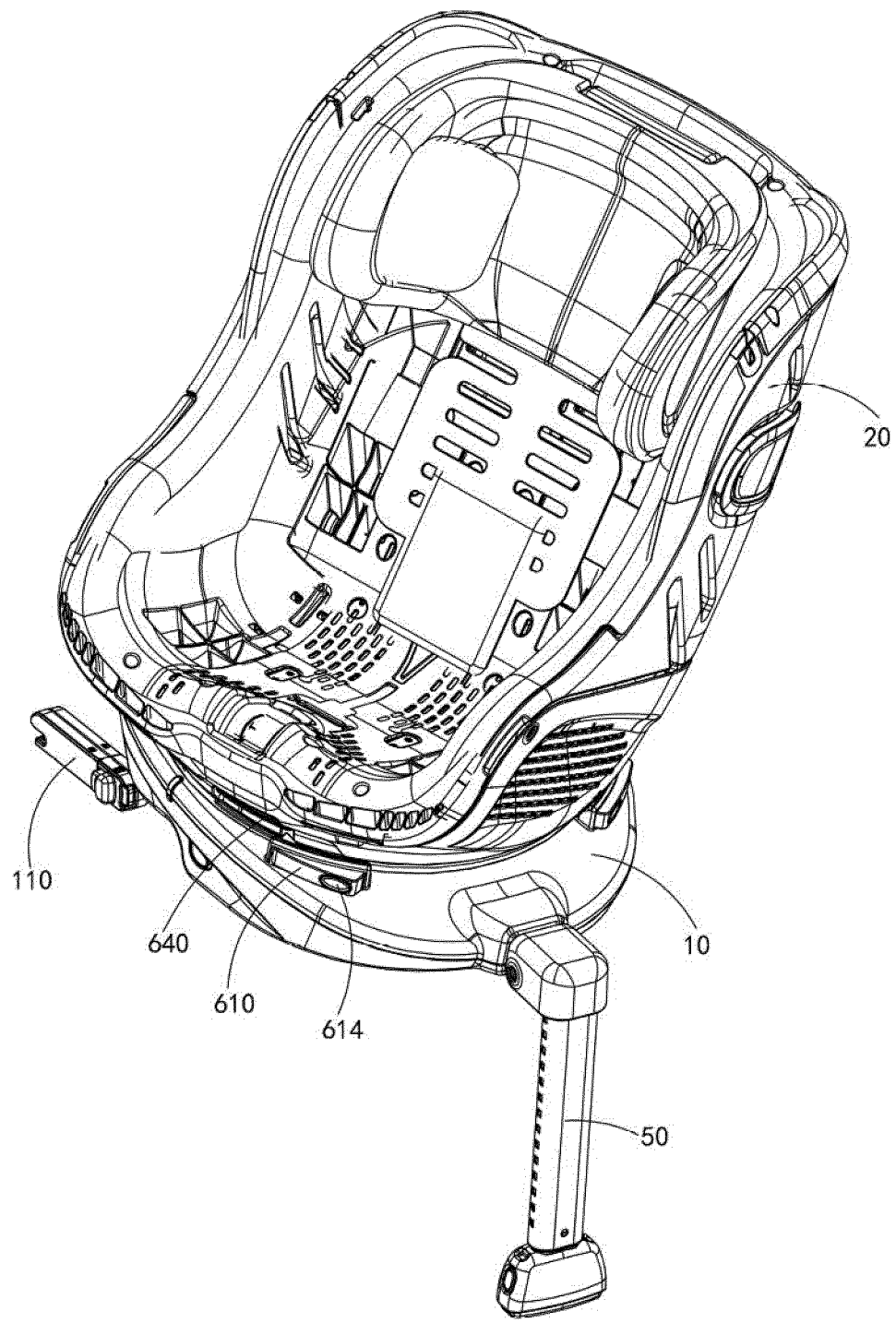
FIG. 7 is a perspective view of the FIG. 1 embodiment of the child safety seat of the present disclosure, in which the seat is rotated by another angle relative to the state in FIG. 1.
Figure 8:
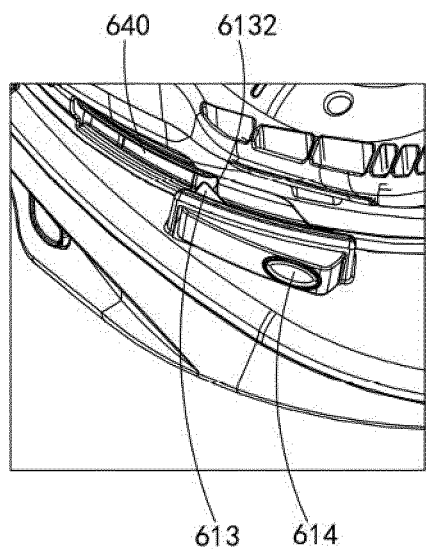
FIG. 8 is a partial enlarged view of the FIG. 7 embodiment.

FIG. 1 is a perspective view of an embodiment of the child safety seat of the present disclosure; FIG. 2 is a top view of the FIG. 1 embodiment of the child safety seat of the present disclosure, in which the seat is removed in order to show an internal structure; FIG. 3 is a top view of the FIG. 1 embodiment of the child safety seat of the present disclosure, in which the seat and an upper part of the base are removed in order to show the internal structure; FIG. 4 is a partial enlarged view of the FIG. 3 embodiment; FIG. 5 is a perspective view of the FIG. 1 embodiment of the child safety seat of the present disclosure, in which the seat is rotated by an angle relative to the state in FIG. 1; FIG. 6 is a partial enlarged view of the FIG. 5 embodiment; FIG. 7 is a perspective view of the FIG. 1 embodiment of the child safety seat of the present disclosure, in which the seat is rotated by another angle relative to the state in FIG. 1; FIG. 8 is a partial enlarged view of the FIG. 7 embodiment.

An embodiment of the present disclosure will now be described with reference to FIGS. 1-8.

The child safety seat of an embodiment of the present disclosure includes: a base 10; a rotatable seat 20, which is rotatably arranged above the base 10 and has a forward-facing mode and a rearward-facing mode relative to the base 10; and a misuse prevention mechanism 60 formed on the base and the rotatable seat 20, and having a locked state and a released state. In the locked state, the misuse prevention mechanism 60 prevents the seat from rotating from the rearward-facing mode to the forward-facing mode, and in the released state, the misuse prevention mechanism 60 allows the rotatable seat 20 to rotate from the rearward-facing mode to the forward-facing mode.

When the misuse prevention mechanism 60 is in the locked state and in the case that the rotatable seat 20 is between the rearward-facing mode and a rotation threshold angle, a rotation angle of the rotatable seat 20 in the first direction cannot be greater than the rotation threshold angle. When the misuse prevention mechanism 60 is in the released state and in the case that the rotatable seat 20 is between the rearward-facing mode and the rotation threshold angle, the rotation angle of the rotatable seat 20 may be greater than the rotation threshold angle. The first direction is a rotation direction from the rearward-facing mode to the forward-facing mode.

When the child safety seat 1 is installed in a right rear seat of a vehicle (the right rear seat when viewed from inside the vehicle facing toward the front of the vehicle), the first direction may be a counterclockwise direction. When the child safety seat 1 is installed in a left rear seat of the vehicle, the first direction may be a clockwise direction.

The base 10 may be placed on a seat of the vehicle. The rotatable seat may face a front of the vehicle in the forward-facing mode, and the rotatable seat may face a rear of the vehicle in the rearward-facing mode.

The misuse prevention mechanism 60 may allow the seat to be rotated from the forward-facing mode to the rearward-facing mode in a second direction opposite to the first direction in both the locked state and the released state.

The misuse prevention mechanism 60 may achieve the above-mentioned functions by working at a certain position during the rotation. Specifically, the rotatable seat 20 may have a rotation threshold angle during the rotation from the rearward-facing mode to the forward-facing mode. The rotation threshold angle may be an angle within the range of 90° to 180°, for example, 100°, 110°, 120°, 130°, 140°, 150°, 160°, or 170°. When the misuse prevention mechanism 60 is in the locked state and the rotatable seat 20 is rotated to the rotation threshold angle, the rotatable seat 20 cannot be further rotated toward the forward-facing mode. When the misuse prevention mechanism 60 is in the released state and the rotatable seat 20 is rotated to the rotation threshold angle, the rotatable seat 20 is not obstructed and may be further rotated to the forward-facing mode. Optionally, the above-mentioned rotation threshold angle may also be designed to a plurality of angles, for example, two angles, three angles, and so on.

The misuse prevention mechanism 60 may include a plurality of components, and these components may be formed on the base 10 and the rotatable seat 20, respectively. Optionally, all components of the misuse prevention mechanism 60 may be provided on one of the base 10 and the rotatable seat 20.

In the present disclosure, the forward-facing mode means that the rotatable seat 20 faces the front of the vehicle, and the rearward-facing mode means that the rotatable seat 20 faces the rear of the vehicle. In other words, in the forward-facing mode, the child faces the front of the vehicle when sitting on the rotatable seat 20, and in the rearward-facing mode, the child faces the rear of the vehicle when sitting on the rotatable seat 20.

In this embodiment, the child safety seat 1 may further include: an anchor portion 110, which is arranged at a rear of the base 10 and extends backward; and a support pole 50, which is arranged at a front of the base 10 and extends downward. A lower end of the support pole 50 may be configured to abut against a floor of the vehicle. The anchor portion 110 may be, for example, a fixing device for an ISOFIX interface, which may have two rigid arms provided on both sides. The support pole 50 provides a third fixing point for the child safety seat 1 so as to better prevent the child safety seat 1 from turning over when subjected to an impact. Optionally, the anchor portion 110 may be a fixing device used for other interfaces, for example, a LATCH, or the like. The present disclosure is not limited thereto.

The misuse prevention mechanism 60 may include: a button 610, which is provided on the base 10 and can be actuated to change the misuse prevention mechanism 60 from the locked state to the released state; a restore member 630 for applying a restoring force to the button 610; a locking groove 640 is provided on an outer periphery of the seat 20 and cooperates with the button 610 to realize the locked state and the released state.

A contact surface of the base 20 and the seat 20 may be formed with a circular portion to facilitate rotation relative to each other. A rotation axis of the seat 20 relative to the base 10 may be substantially perpendicular to an upper surface of the base 10. The misuse prevention mechanism 60 may form two symmetrical parts on both sides of the child safety seat 1, so as to facilitate the rotation and locking of the seat 20 in both clockwise and counterclockwise directions, and it is also convenient to operate the misuse prevention mechanism 60 from different sides. In the following, only a structure of the misuse prevention mechanism 60 on one side will be described.

As shown in FIGS. 2 to 4, the button 610 is arranged around the outer periphery of a circular cavity on the upper surface of the base 10, and the button 610 has a first end 616 and a second end 617 opposite to each other. A slope portion 613 is formed on a radially (relative to a radial direction of the circular cavity) inner side of the first end 616, and a press portion 614 is formed on a radially outer side of the second end 617. The press portion 614 may be formed with a mark to remind an operator of a pressable part, and may be formed of a flexible material to provide a good contact feeling when pressed. Optionally, the press portion 614 is formed into an oval shape to be close to the shape of a person's thumb. The shaft portion 615 passes through a middle portion of the button 610 so that the button 610 can be pivoted about the shaft portion 615. The restore member 630 (for example, a spring) may be disposed on a radially inner side of the second end 617, and both ends of the restore member 630 may be configured to abut against the radially inner side of the second end 617 and the base 10 to apply a pushing force. In this way, when a pushing force is applied to the press portion 614, the second end 617 overcomes a restoring force of the restore member 630 and moves radially inward, so that the first end 616 moves in an opposite direction, that is, radially outward.

The slope portion 613 may be integrally formed with the button 610, or separately formed and fixed to the button 610. The slope portion 613 has a stop side 6131 and a drive side 6132. The stop side 6131 may be formed as a substantially radial edge, and the drive side 6132 may be formed as a closely circumferential edge (i.e., an included angle between the closely circumferential edge and the radial direction may be greater than an included angle between the closely circumferential edge and the circumferential direction). The above-mentioned circumferential direction refers to a circumferential direction of the circular cavity on the upper surface of the base 10.

Referring to FIGS. 5-8, when the rotatable seat 20 rotates from the rearward-facing mode to the forward-facing mode, the button 610 slides along the outer periphery of a lower side of the rotatable seat 20. It should be noted that the sliding of the button 610 is relative sliding with reference to the rotatable seat 20, and in fact, the button 610 provided on the base 10 is stationary with reference to the base 10, while the rotatable seat 20 may be rotated with reference to the base 10. The sliding of the button 610 described below has the same meaning. Taking the button 610 shown in FIG. 6 as an example, when the slope portion 613 slides to a right end of the locking groove 640, since the locking groove 640 is recessed radially inward, the return member 630 pushes the slope portion 613 to protrude into the locking groove 640. Then, the rotatable seat 20 can be further rotated relative to the base 10. When the slope portion 613 slides to the left end of the lock groove 640, the stop side 6131 is configured to abut against a left end of the lock groove 640 to prevent the rotatable seat 20 from sliding further (the locked state).

At this time, it is necessary to apply a force to the press portion 614 to move the slope portion 613 to a position away from the locking groove 640 (the released state), and continue to rotate the rotatable seat 20 while maintaining the force applied to the press portion 614, so that the slope portion 613 moves out of the area of the locking groove 640. After that, the rotatable seat 20 can be further rotated to the final forward-facing mode.

Conversely, when it is necessary to rotate the rotatable seat 20 from the forward-facing mode to the rearward-facing mode, the button 610 slides along the outer periphery of the lower side of the seat. When the slope portion 613 slides to the left end of the locking groove 640, since the locking groove 640 is recessed radially inward, the restore member 630 pushes the slope portion 613 to protrude into the locking groove 640. Then, the rotatable seat 20 can be further rotated relative to the base 10. When the slope portion 613 slides to the right end of the locking groove 640, the drive side 6132 contacts the right end of the locking groove 640. Since the drive side 6132 has a gentle slope, a force for rotating the rotatable seat 20 in the circumferential direction can be converted into a force for pushing the slope portion 613 radially outward (at this time, the drive side 6132 is equivalent to a wedge). In this way, the second end 617 overcomes the restoring force of the restore member 630 and moves radially outward, so as to escape from the locking groove 640. In this process, the pressing part 614 does not need to be actuated by an external force. In other words, it is possible to rotate from the forward-facing mode to the rearward-facing mode by only rotating the rotatable seat 20.

As shown in FIG. 1, the misuse prevention mechanism 60 may include two buttons 610 symmetrically arranged on both sides of the base 10 and one locking groove 640 centrally arranged on the rotatable seat 20. Optionally, another number of buttons 610 may be provided, such as one, and another number of locking slots 640, such as two, may be provided. In the case where two locking grooves 640 and two buttons 610 are provided, the locking grooves 640 and the buttons 610 may correspond one-to-one. At this time, one side of the locking groove 640 that is in contact with the stop side 6131 may be set to extend in a direction close to the radial direction, so as to better cooperate with the stop side 6131 to achieve a locking function; and a side of the locking groove 640 that is in contact with the drive side 6132 may be set to be inclined relative to the radial direction, or be set to have an angle substantially consistent with the drive side 6132 with respect to the radial direction, so as to better cooperate with the drive side 6132 to realize an actuation function of the wedge.

Figure 9:
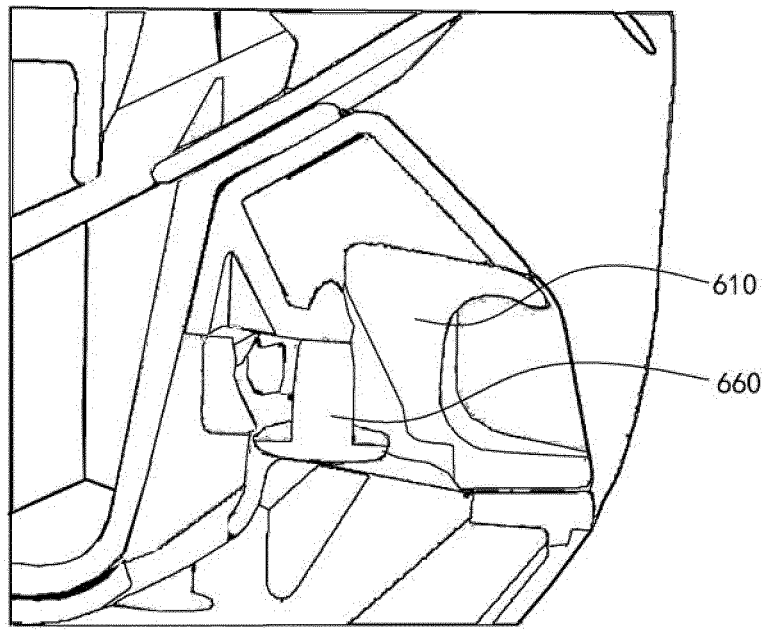
FIG. 9 is a schematic partial view of an other embodiment of the child safety seat of the present disclosure.
Figure 10:
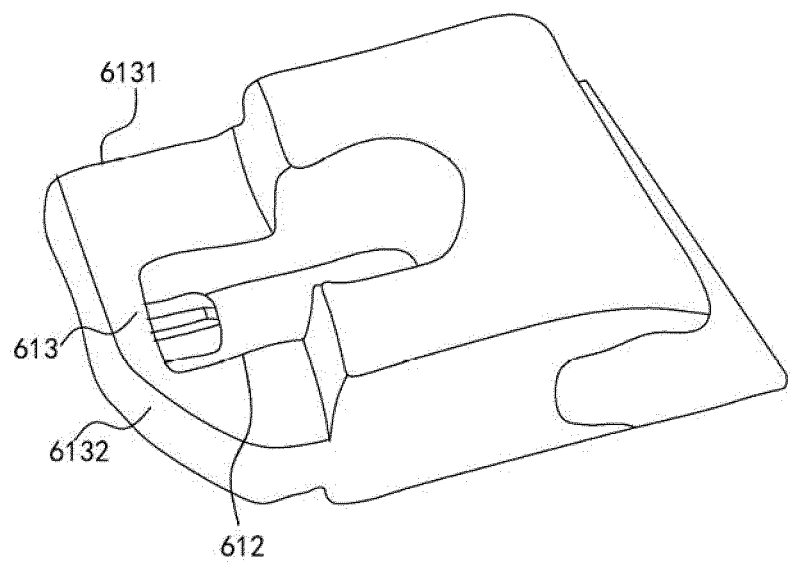
FIG. 10 is a schematic perspective view of a button of the other embodiment of the child safety seat of the present disclosure.

FIG. 9 is a schematic partial view of an other embodiment of the child safety seat of the present disclosure; and FIG. 10 is a schematic perspective view of a button of the other embodiment of the child safety seat of the present disclosure.

The other embodiment of the present disclosure will now be described with reference to FIGS. 9 and 10, in which the description of the same parts as the FIG. 1 embodiment will be omitted.

In this embodiment, the button 610 may be formed in a receiving hole 120 on the base 10 and may be partially exposed to the outside.

A through hole 612 may be formed on the button 610, and a fastener 660 (such as a screw) may pass through the through hole 612 to slidably fix the button 610 on the base 10. The fastener 660 can pass through the elongated through hole 612 from below. Since a length of the through hole 612 is greater than that of the fastener 660, the button 610 may slide in the radial direction (left and right direction in FIG. 9) relative to the fastener 660. The restore member 630 can be arranged in the through hole 612, and the two ends of the restore member 630 may be respectively configured to abut against one side of the through hole 630 and the fastener 660 to apply an elastic force to the button 610 radially inward (the left side in FIG. 9). An inner side (the left side in FIGS. 9 and 10) of the button 610 is formed as a slope portion 613. The slope portion 613 may have a stop side 6131 and a drive side 6132.

When the rotatable seat 20 is rotated from the rearward-facing mode to the forward-facing mode, the stop side 6131 may be configured to abut against a side of the locking groove 640 to prevent further rotation of the rotatable seat 20, and when the rotatable seat 20 rotates from the forward-facing mode to the rearward-facing mode, the other side of the locking groove 640 may push the drive side 6132 outwardly, so that the rotatable seat 20 may be further rotated to the rearward-facing mode. The above process is basically the same as the FIG. 1 embodiment. It should be noted that the button 610 of this embodiment does not form a lever structure. When the button 610 needs to be actuated to release the slope portion 613 from blocking or locking the locking groove 640, this can be done by pulling the button 610 radially outward. As shown in FIG. 9, a cavity may be formed on a radially outer side of the button 610, so as to facilitate the finger to protrude into the button 610 to pull the button 610 outwardly. FIG. 9 shows the released state where the button 610 has been pulled outward, and at this time, the radially outer side of the button 610 protrudes to a position being flush with the receiving hole 120. When the button 610 is not actuated (locked state), due to the action of the return member 630, the outside of the button 610 retracts to the inside of the receiving hole 120, that is, the button 610 is further to the left relative to the position shown in FIG. 9 (not shown).

Since the button 610 of this embodiment does not protrude beyond the surface of the base 10, the child safety seat 1 can have a smoother appearance.

Figure 11:
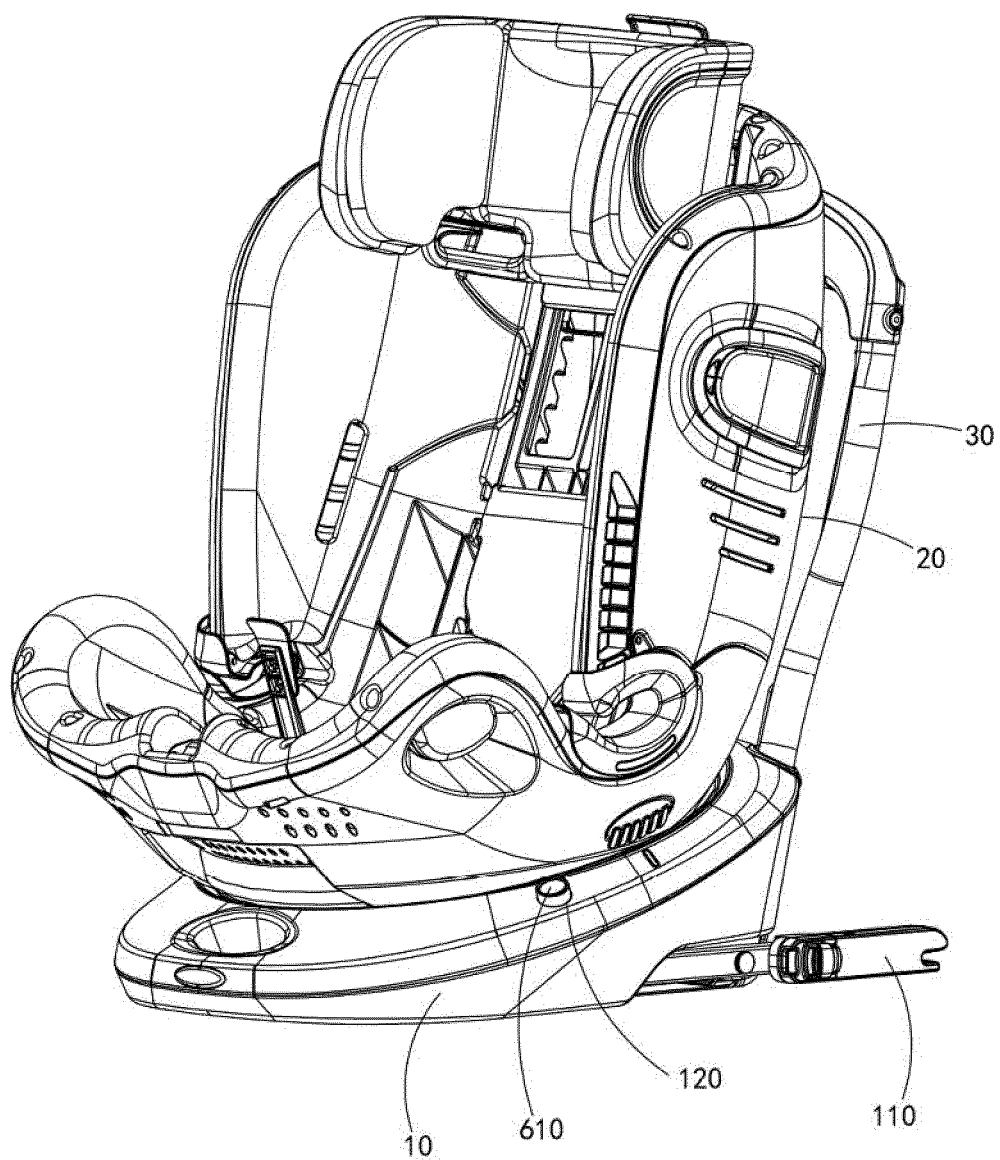
FIG. 11 is a perspective view of an other embodiment of the child safety seat of the present disclosure.
Figure 12:
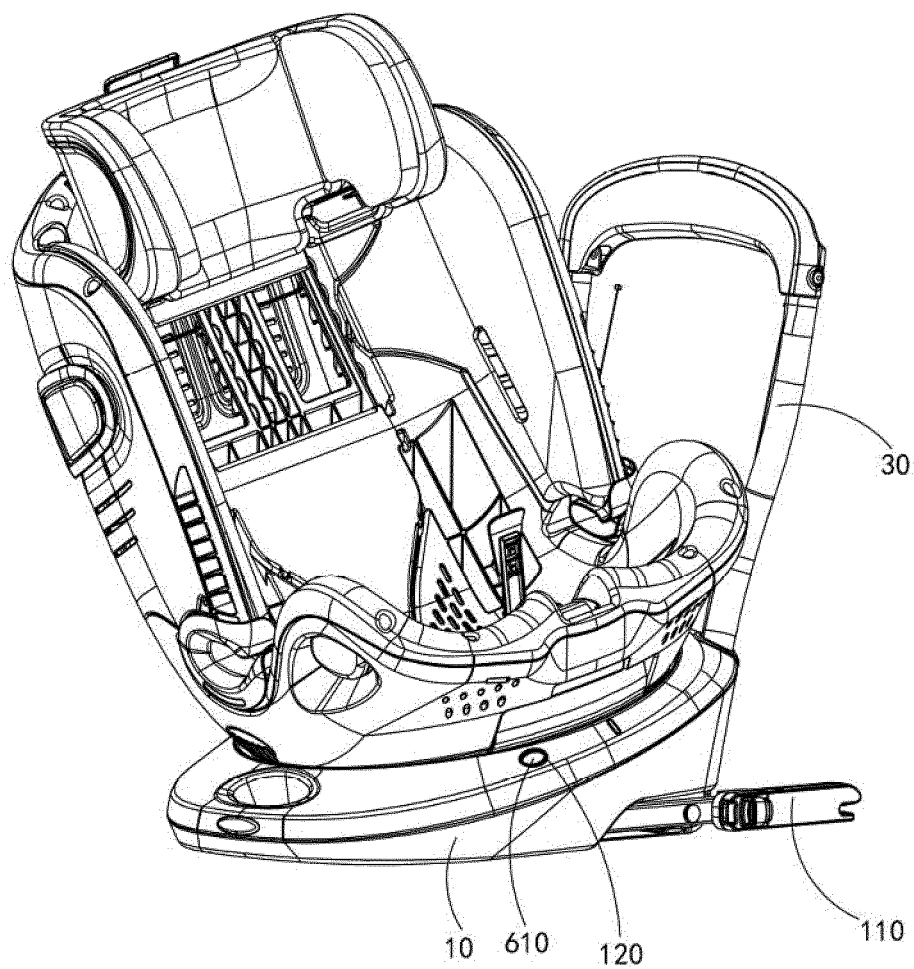
FIG. 12 is a perspective view of the FIG. 11 embodiment of the child safety seat of the present disclosure, in which the seat is rotated by an angle relative to the state in FIG. 11.
Figure 13:
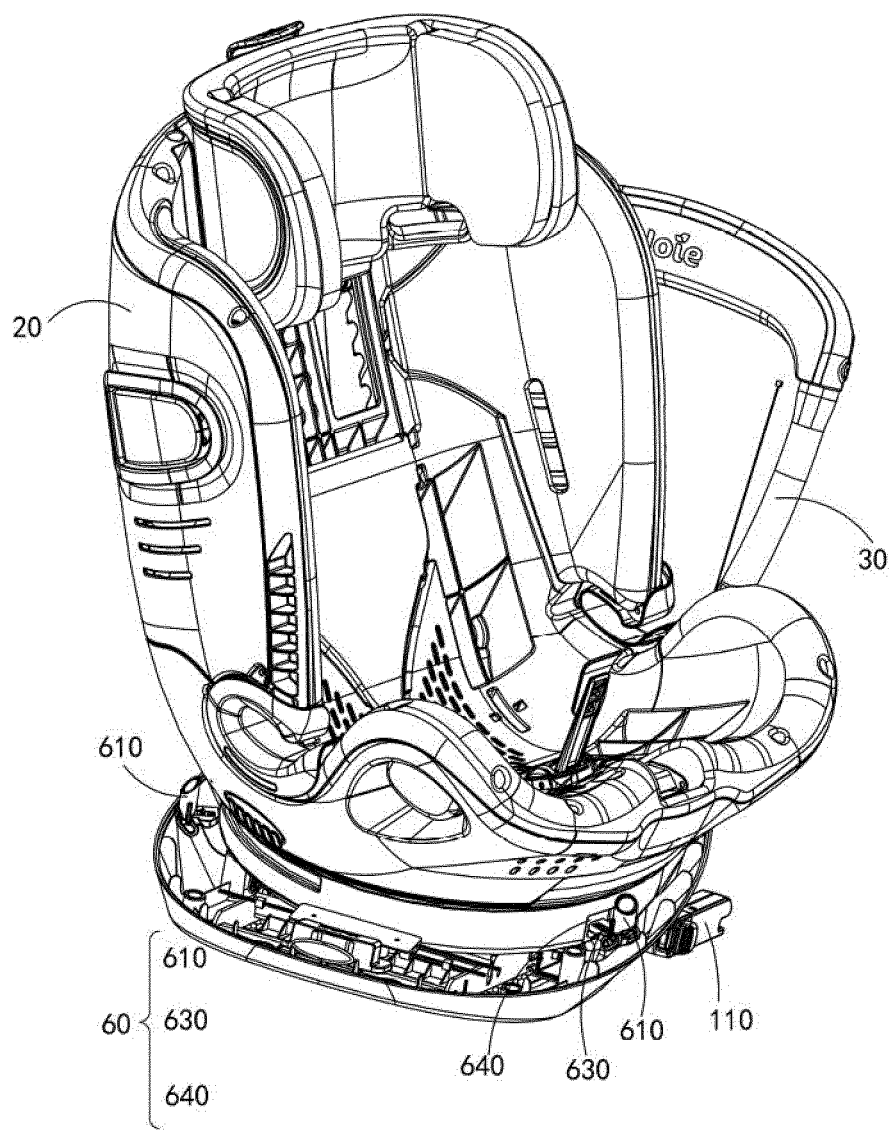
FIG. 13 is a perspective view of the FIG. 11 embodiment of the child safety seat of the present disclosure, in which an upper part of the base is removed to show an internal structure.
Figure 14:
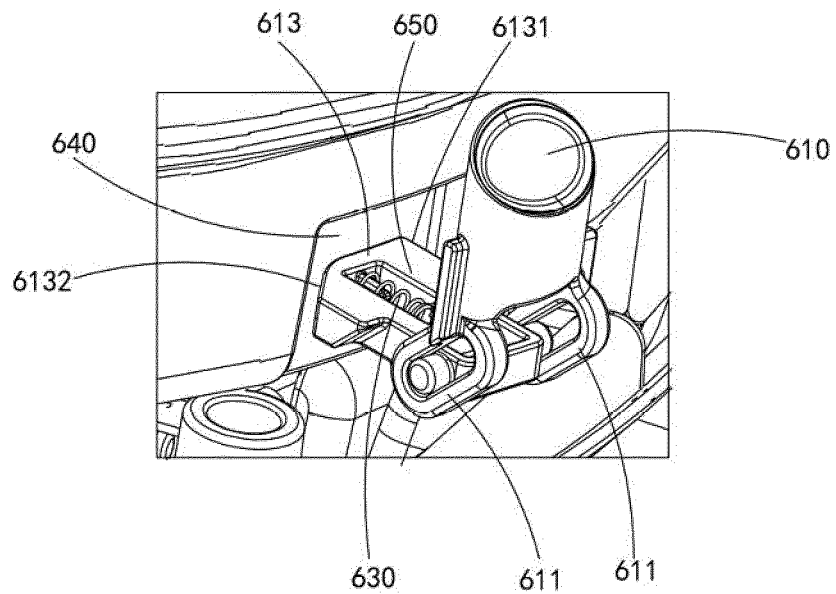
FIG. 14 is a partial enlarged view of the FIG. 13 embodiment.

FIG. 11 is a perspective view of a an other embodiment of the child safety seat of the present disclosure; FIG. 12 is a perspective view of the FIG. 11 embodiment of the child safety seat of the present disclosure, in which the seat is rotated by an angle relative to the state in FIG. 11; FIG. 13 is a perspective view of the FIG. 11 embodiment of the child safety seat of the present disclosure, in which an upper part of the base is removed to show an internal structure; and FIG. 14 is a partial enlarged view of the FIG. 13 embodiment.

The FIG. 11 embodiment of the present disclosure will now be described with reference to FIGS. 11-14, in which the description of the same parts as the FIG. 1 embodiment will be omitted.

The child safety seat 1 of this embodiment may further include: an anchor portion 110 arranged at the rear of the base 10 and extending backward; and a top pole 30 arranged on the rear of the base 10 and extending upward. The anchor portion 110 may be, for example, a fixing device for an ISOFIX interface, which may have two rigid arms provided on both sides. A (fabric) belt fixing device (for example, a Top Tether fixing device) may be connected to the top pole 30 to provide a third fixing point for the child safety seat 1 to better prevent the child safety seat 1 from turning over when impacted.

It should be understood that the structural features between different embodiments can be combined with each other to form more embodiments. For example, the top pole 30 of this embodiment can be exchanged with the support pole 50 of the first embodiment, or the second embodiment can have any one of the top pole 30 and the support pole 50.

The misuse prevention mechanism 60 may further include a blocking member 650. A drive chute 611 is formed in the button 610. Optionally, there are one or two drive chutes 611. The blocking member 650 may be coupled to the drive chute 611. The blocking member 650 may be inserted into the two drive chutes 611 via pins formed on both sides, so that the movement of the button 610 in one direction (for example, in the up and down direction) causes the blocking member to move in another direction (radial direction). An inner side (i.e., a radially inner side) of the blocking member 650 is formed as a slope portion 613. The slope portion 613 may have a stop side 6131 and a drive side 6132.

Optionally, the drive chute 611 is formed to have an angle of about 45° with respect to the radial direction. When the button 610 is pressed down, the blocking member 650 is driven by the drive chute 611 to move radially outward.

The blocking member 650 may have a groove for accommodating the restore member 630. Both ends of the restore member 630 are configured to abut against the blocking member 650 and the base 10 respectively to apply a radially inward elastic force to the blocking member 650.

Both sides of the button 610 may be respectively provided with vertical ribs, and the ribs may be received in corresponding guide grooves of the base 10 to guide a movement of the button 610 in a vertical direction. An upper part of the button 610 may be formed in a cylindrical shape. The button 610 may be formed in the receiving hole 120 on the base 10 and may be partially exposed to the outside. The upper surface of the button 610 is formed in a shape matching with a portion of the base around the receiving hole 120.

The button 610, the blocking member 650 and the restore member 630 may be respectively arranged on both sides of the base (with respect to a symmetry axis of the child safety seat 1 in the front-rear direction), and one locking groove 640 may be centrally provided at the front of the rotatable seat 20.

When the rotatable seat 20 is rotated from the rearward-facing mode to the forward-facing mode, the stop side 6131 may be configured to abut against a side of the locking groove 640 to prevent the rotatable seat 20 from further rotating. At this time, while pressing the button 610, the rotatable seat 20 can be further rotated to finally rotate the rotatable seat 20 to the forward-facing mode. When the rotatable seat 20 is rotated from the forward-facing mode to the rearward-facing mode, another side of the locking groove 640 may push the drive side 6132 outwardly (radially outside), so that the rotatable seat 20 can be further rotated to the rearward-facing mode without pressing the button 610. When the rotatable seat 20 is correctly rotated to the rearward-facing mode or the forward-facing mode, an additional locking mechanism may be provided to correctly maintain the rotatable seat 20 in the rearward-facing mode or the forward-facing mode.

In the locked state (that is, when the slope portion 613 is in the driving groove 640 and the button 610 is not pressed), an outer side of the button 610 protrudes out of the receiving hole 120, and in the released state (that is, when the button 610 is pressed), the outer side of the button 610 is retracted to a position being flush with the receiving hole 120.

An indicator mark may be formed on an outer peripheral surface of an upper end of the button 610 to indicate the locked state. For example, the mark may be a specific color, for example, red. An upper surface of the button 610 may be formed in a different color from the indicator mark, for example, white. Optionally, the aforementioned locked state of the child safety seat 1 may be indicated by sound and/or light. This disclosure is not limited to these examples. When the rotatable seat 20 is locked during rotation from the rearward-facing mode to the forward-facing mode and cannot be rotated further, the indicator mark can intuitively remind the user to press the button 610 to enter the release state.

Regarding the rotation from the rearward-facing mode to the forward-facing mode (and the reverse process), the present embodiment is basically the same as the first embodiment. It should be noted that the button 610 of this embodiment does not form a lever structure. When the blocking member 650 needs to be actuated to release the blocking or locking of the slope portion 613 to the locking groove 640, this can be done by pressing the button 610 downwardly.

In this embodiment, since only a part of the button 610 protrudes out of the base 10, the child safety seat 1 may have a relatively smooth appearance. At the same time, the part of the button 610 protruding out of the base 10 may more intuitively indicate the current state of the misuse prevention mechanism 60 to prevent the operator from forgetting to press the button 610 and then failing to correctly switch to the forward-facing mode.

In the above embodiments, the slope portion 613 is locked through the cooperation of the relatively steep (even completely radial) stop side 6131 and the locking groove 640 to achieve the locked state, and the relatively smooth drive side 6132 is matched with the locking groove 640 to achieve the release state, which is only an optional example. The misuse prevention mechanism 60 may also be one-way locked to the rotatable seat 20 by other mechanisms, and can be unlocked to the released state by other ways.

Those skilled in the art will easily think of other embodiments of the present disclosure after considering the specification and practicing the disclosure disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed by the present disclosure. The description and the embodiments are only regarded as exemplary, and the true scope and spirit of the present disclosure are pointed out by the claims of the present disclosure.

Although the present disclosure has been described with reference to the exemplary embodiments, the terms used are illustrative and exemplary rather than restrictive. Since the present disclosure can be implemented in various forms without departing from the spirit and essence of the present disclosure, it should be understood that the above-mentioned embodiments are not limited to any of the foregoing details, but should be interpreted in the broadest sense within the scope defined by the claims. Therefore, all changes falling within the scope of the claims or their equivalents shall be covered by the claims.

REFERENCE NUMERAL LIST

Child Safety Seat 1
  Base 10
    Anchor Portion 110
    Receiving Hole 120
  Rotatable seat 20
  Top Pole 30
  Support Pole 50
  Misuse Prevention Mechanism 60
    Button 610
      Drive Chute 611
      Through Hole 612
      Slope Portion 613
        Stop Side 6131
        Drive Side 6132
      Press Portion 614
      Shaft 615
      First End 616
      Second End 617
    Restore Member 630
    Locking Groove 640
    Blocking Member 650
    Fastener 660

What is claimed is:

1. A child safety seat comprising:
a base;
a rotatable seat above the base and having a forward-facing mode and a rearward-facing mode relative to the base; and
a misuse prevention mechanism formed on the base and the rotatable seat and having a locked state and a released state,
wherein
when the misuse prevention mechanism is in the locked state and the rotatable seat is between the rearward-facing mode and a rotation threshold angle, a rotation angle of the rotatable seat in a first direction cannot be greater than the rotation threshold angle,
when the misuse prevention mechanism is in the released state and the rotatable seat is between the rearward-facing mode and the rotation threshold angle, the rotation angle of the rotatable seat can be greater than the rotation threshold angle,
the first direction is a rotation direction from the rearward-facing mode to the forward-facing mode, and
the misuse prevention mechanism allows the rotatable seat to be rotated from the forward-facing mode to the rearward-facing mode in a second direction opposite to the first direction in the locked state.

2. The child safety seat according to claim 1, wherein the rotation threshold angle is an angle within a range of 90° to 180°.

3. The child safety seat according to claim 1, wherein the rotation threshold angle is one of 100°, 110°, 120°, 130°, 140°, 150°, 160° and 170°.

4. The child safety seat according to claim 1, wherein when the child safety seat is installed in a right rear seat of a vehicle, the first direction is a counterclockwise direction, and when the child safety seat is installed in a left rear seat of the vehicle, the first direction is a clockwise direction.

5. The child safety seat according to claim 1, wherein
the base can be placed on a seat of a vehicle, and
when the base is placed on the seat of the vehicle, the rotatable seat faces a front of the vehicle in the forward-facing mode, and the rotatable seat faces a rear of the vehicle in the rearward-facing mode.

6. The child safety seat according to claim 1, wherein the misuse prevention mechanism allows the rotatable seat to be rotated from the forward-facing mode to the rearward-facing mode in the second direction opposite to the first direction in the released state.

7. The child safety seat according to claim 1, further comprising:
an anchor portion provided at a rear of the base and extending backward;
and
a top pole provided at the rear of the base and extending upward.

8. The child safety seat according to claim 1, further comprising:
an anchor portion provided at a rear of the base and extending backward; and
a support pole provided at a front of the base and extending downward, wherein a lower end of the support pole is configured to abut against a floor of a vehicle.

9. The child safety seat according to claim 1, wherein the misuse prevention mechanism comprises:
a button provided on the base and configured to be actuated to change the misuse prevention mechanism from the locked state to the released state;
a restore member used to apply a restoring force to the button; and
a locking groove provided on an outer periphery of the rotatable seat and cooperated with the button to realize the locked state and the released state.

10. The child safety seat according to claim 9, wherein the misuse prevention mechanism comprises two buttons symmetrically provided on the base and one locking groove.

11. The child safety seat according to claim 9, wherein a slope portion is formed on an inner side of a first end of the button, a press portion is formed on an outer side of a second end of the button, the button is fixed to the base with a shaft between the first end and the second end, the restore member is provided between the base and the second end of the button to push the second end of the button outwardly, and the slope portion has a stop side and a drive side, and
wherein when the rotatable seat is rotated from the rearward-facing mode to the forward-facing mode, the stop side is configured to abut against a side of the locking groove to prevent further rotation of the seat, and when the seat is rotated from the forward-facing mode to the rearward-facing mode, another side of the locking groove pushes the drive side outwardly so as to allow the seat to further rotate to the rearward-facing mode.

12. The child safety seat according to claim 9, wherein a through hole is formed on the button, a fastener passes through the through hole to slidably fix the button to the base, the restore member is provided in the through hole, both ends of the restore member are configured to abut against a side of the through hole and the fastener respectively, and an inner side of the button is formed as a slope portion comprising a stop side and a drive side, and
wherein when the rotatable seat is rotated from the rearward-facing mode to the forward-facing mode, the stop side is configured to abut against a side of the locking groove to prevent further rotation of the rotatable seat, and when the rotatable seat is rotated from the forward-facing mode to the rearward-facing mode, another side of the locking groove pushes the drive side outwardly so as to allow the rotatable seat to further rotate to the rearward-facing mode.

13. The child safety seat according to claim 9, wherein the misuse prevention mechanism further comprises a blocking member, a drive chute formed on the button, and the blocking member coupled to the drive chute, so that a movement of the button in one direction causes a movement of the blocking member in another direction, and an inner side of the blocking member is formed as a slope portion comprising a stop side and a drive side, and
wherein when the rotatable seat is rotated from the rearward-facing mode to the forward-facing mode, the stop side is configured to abut against a side of the locking groove to prevent further rotation of the rotatable seat, and when the rotatable seat is rotated from the forward-facing mode to the rearward-facing mode, another side of the locking groove pushes the drive side outwardly so as to allow the rotatable seat to further rotate to the rearward-facing mode.

14. The child safety seat according to claim 9, wherein a receiving hole is formed on the base, in the locked state, an outer side of the button retracts to an inner side of the receiving hole, and in the released state, the outer side of the button protrudes to a position flush with the receiving hole.

15. The child safety seat according to claim 14, wherein an indicator mark is formed on the button, and in the locked state, the indicator mark is exposed outside the receiving hole.

16. The child safety seat according to claim 9, wherein a receiving hole is formed on the base, in the locked state, an outer side of the button protrudes to an outer side of the receiving hole, and in the released state, the outer side of the button is retracted to a position flush with the receiving hole.

17. A child safety seat comprising:
a base;
a rotatable seat above the base and having a forward-facing mode and a rearward-facing mode relative to the base; and
a misuse prevention mechanism formed on the base and the rotatable seat and having a locked state and a released state,
wherein
when the misuse prevention mechanism is in the locked state and the rotatable seat is between the rearward-facing mode and a rotation threshold angle, a rotation angle of the rotatable seat in a first direction cannot be greater than the rotation threshold angle,
when the misuse prevention mechanism is in the released state and the rotatable seat is between the rearward-facing mode and the rotation threshold angle, the rotation angle of the rotatable seat can be greater than the rotation threshold angle,
the first direction is a rotation direction from the rearward-facing mode to the forward-facing mode, and
the misuse prevention mechanism comprises:
a button provided on the base and configured to be actuated to change the misuse prevention mechanism from the locked state to the released state;
a restore member used to apply a restoring force to the button; and
a locking groove provided on an outer periphery of the rotatable seat and cooperated with the button to realize the locked state and the released state.

18. The child safety seat according to claim 17, wherein a slope portion is formed on an inner side of a first end of the button, a press portion is formed on an outer side of a second end of the button, the button is fixed to the base with a shaft between the first end and the second end, the restore member is provided between the base and the second end of the button to push the second end of the button outwardly, and the slope portion has a stop side and a drive side.

19. The child safety seat according to claim 17, wherein a through hole is formed on the button, a fastener passes through the through hole to slidably fix the button to the base, the restore member is provided in the through hole, both ends of the restore member are configured to abut against a side of the through hole and the fastener respectively, and an inner side of the button is formed as a slope portion comprising a stop side and a drive side.

20. The child safety seat according to claim 17, wherein the misuse prevention mechanism further comprises a blocking member, a drive chute formed on the button, and the blocking member coupled to the drive chute, so that a movement of the button in one direction causes a movement of the blocking member in another direction, and an inner side of the blocking member is formed as a slope portion comprising a stop side and a drive side.

* * * * *